US008412652B2

(12) United States Patent
Yu et al.

(10) Patent No.: US 8,412,652 B2
(45) Date of Patent: Apr. 2, 2013

(54) APPARATUS AND METHODS FOR OPERATOR TRAINING IN INFORMATION EXTRACTION

(75) Inventors: Cong Yu, Hoboken, NJ (US); Mridul Muralidharan, Bangalore (IN); Arun Shankar Iyer, Bangalore (IN); Philip Lewis Bohannon, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 578 days.

(21) Appl. No.: 12/398,126

(22) Filed: Mar. 4, 2009

(65) Prior Publication Data

US 2010/0227301 A1 Sep. 9, 2010

(51) Int. Cl.
*G06F 15/18* (2006.01)
(52) U.S. Cl. .......................................... 706/14
(58) Field of Classification Search ........................ None
See application file for complete search history.

(56) References Cited

PUBLICATIONS

Bohannon et al., "Purple SOX Extraction Management System", Dec. 2008, SIGMOD Record, vol. 31 No. 4, pp. 21-27.*
Littmann et al., "Cascade Network Architectures", Jun. 1992, Neural Networks, vol. 2, pp. 398-404.*
RDF Primer "W3 Recommendation Feb. 10, 2004" http://www.w3.org/TR/2004/REC-rdf-primer-20040210; pp. 1-83, downloaded from the worldwide web on Feb. 6, 2009.
DeRose et al., "Building Structured Web Community Portals: A Top-Down, Compositional, and Incremental Approach", In VLDB, 2007. pp. 399-410.
Ferrucci et al., "UIMA: An Architectural Approach to Unstructured Information Processing in the Corporate Research Environment", Natural Language Engineering, 10(3-4):327{348, 2004.
Mierswa et al.,. "YALE: A Rapid Prototyping for Complex Data Mining Tasks". In KDD, 2006, pp. 1-6.
Shen e tal., "Declarative Information Extraction Using Datalog with Embedded Extraction Predicates". In VLDB, 2007, pp. 1-12.

* cited by examiner

*Primary Examiner* — Jeffrey A Gaffin
*Assistant Examiner* — Paulinho E Smith
(74) *Attorney, Agent, or Firm* — Weaver Austin Villeneuve & Sampson LLP

(57) ABSTRACT

After receipt of a training and execution plan, a trainer operator is automatically trained based on specified training documents so as to generate a new trained operator for extracting information from documents. The new trained operator is a new version of the trainee operator. Both trainee operators are automatically retained for later use in extracting information from one or more unknown documents. After receipt of the training and execution plan, the new trained operator is automatically executed on one or more unknown documents so as to extract information from such one or more unknown documents.

23 Claims, 10 Drawing Sheets

```
800 ─ OPERATOR MenuPageClassifier

INPUT RELATION WebPageSnapshots AS
        SELECT Y, Y.contentPointer
802 ─   WHERE X.type = "WebPage" and Y.type = "WebPageSnapshot" and IsSnapshotOf(X, Y, s2)
        and Z.type = "RestaurantWebSite" and IncludesPage(Z, X, s1) and Y.type !=
        "MenuPageClassifier" and Y.type != "NonMenuPageClassifier"

OUTPUT RELATION WebPageSnapshotClasses
804 ─   (WebPageSnapshotVar ID, classVar StringValue, scoreVar score)

OUTPUT ASSERTION foo AS
      FROM WebPageSnapshotClasses(idClassVar, classVar, scoreVar),
806 ─   WebPageSnapshots(idVar, contentPointerVar)
      WHERE idVar = idClassVar
      ASSERT type(idClassVar, classVar, scoreVar)
```

*Figure 8*

```
900 ─ MenuPageClassifier SVM IMPLEMENTS MenuPageClassifier

VERSION "0.0" { PARAMETER Single String classPath as "lib/tidy.jar"
902 ─   TRAINING SPEC { PARAMETER Single String modelFile as "classifier/liblinear-
        train.model"
      }

904 ─ RUNNING JAVA PROGRAM
        EXTERNAL AT "/usr/bin/java MenuClassifier $(modelFile)"
        "$(WebPageSnapshots) $(WebPageSnapshotClasses)"
        WORKING IN "."

906 ─ INPUT FILE "menupageclassifier.in" AS WebPageSnapshots
908 ─ OUTPUT FILE "menupageclassifier-class.out" AS WebPageSnapshotClasses
      }
```

*Figure 9*

```
1000 ─ LOGICAL PLAN MenuPageClassification

1002 ─ PARAMETER Single String old version as "0.0", new version as "1.0",
         impl as "MenuPageClassifier SVM", spec as "MenuPageClassifier",
         data.positive as "MenuPageSnapshot", data.negative as "NonMenuPageSnapshot"

1004 ─ OPERATOR UniversalPageClassifierTrainer
         USING IMPLEMENTATION default WITH VERSION default
         SEQUENCE 1 FOLLOW NULL 1006 ─ OPERATOR MenuPageClassifier
         USING IMPLEMENTATION SVM WITH VERSION new version
         SEQUENCE 2 FOLLOW SEQUENCE 1
```

APPARATUS AND METHODS FOR OPERATOR TRAINING IN INFORMATION EXTRACTION

BACKGROUND OF THE INVENTION

The present invention is related to techniques and mechanisms for extracting information from web pages or the like.

Various techniques for information extraction, such as Named Entity Recognition (NER) or any other suitable list extraction technique, refer to the process of locating and classifying parts of documents into pre-defined categories. For instance, categories may include people, locations, and organizations. Unfortunately, conventional systems for performing information extraction are often difficult to manage, troubleshoot, and scale across different types of corpus.

SUMMARY OF THE INVENTION

In certain embodiments, extraction training system and methods have been disclosed. In a specific embodiment, a computer implemented method of extracting information from one or more documents is provided. A training and execution plan is received, and such plan specifies invocation of a trainer operator for initiating training of a trainee operator based on a set of training documents so as to generate a new trained operator that is to then be invoked so as to extract information from one or more unknown documents. The trainee operator is configured to extract information from one or more unknown documents, and each training document is associated with classified information. After receipt of the training and execution plan, the trainer operator is automatically executed to train the trainee operator based on the specified training documents so as to generate a new trained operator for extracting information from documents. The new trained operator is a new version of the trainee operator. After receipt of the training and execution plan, both the trainee operator are automatically retained for later use in extracting information from one or more unknown documents and the new trained operator for later use in extracting information from one or more unknown documents. After receipt of the training and execution plan, the new trained operator is automatically executed on one or more unknown documents so as to extract information from such one or more unknown documents.

In a specific implementation, the trainee operator is an untrained operator. In another aspect, the trainee operator is a previously trained operator and execution of the trainer operator is accomplished by (i) copying a plurality of immutable properties and values from the trainee operator and associating the copied immutable properties and values with the new trained operator and (ii) after execution of a learning algorithm results in a set of final mutable properties based on the training data and the trainee operator, associating the final mutable properties with the new trained operator. In a further aspect, the final mutable properties include one or more of the following: a rule set specifying how to classify information, a plurality of weights for correlating one or more information features of a document with a particular classification result, a model for extracting information from a document, or thresholds for the number of features to consider.

In another implementation, the method includes associating the new trained operator with the extracted information that was generated by such new trained operator so that a user can determine that each piece of extracted information was generated by the new trained operator. In another embodiment, the trainee operator is associated with a particular version value, and the method further includes associating the new trained operator with a new version value that is higher than the particular version value of the trainee operator.

In yet another aspect, the trainee operator was generated by executing a learning algorithm on a first set of training documents that includes classified documents from a first domain that differs from a second domain of the specified training documents. In another embodiment, the values of the final mutable properties differ from a plurality of values of mutable properties as defined by the trainee operator.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

BRIEF DESCRIPTION OF THE DRAWINGS

FIGS. 8 through 10 represent example information components of an extraction pipeline that utilize the trainer operator of FIG. 7.

DETAILED DESCRIPTION OF THE SPECIFIC EMBODIMENTS

Figure 1:
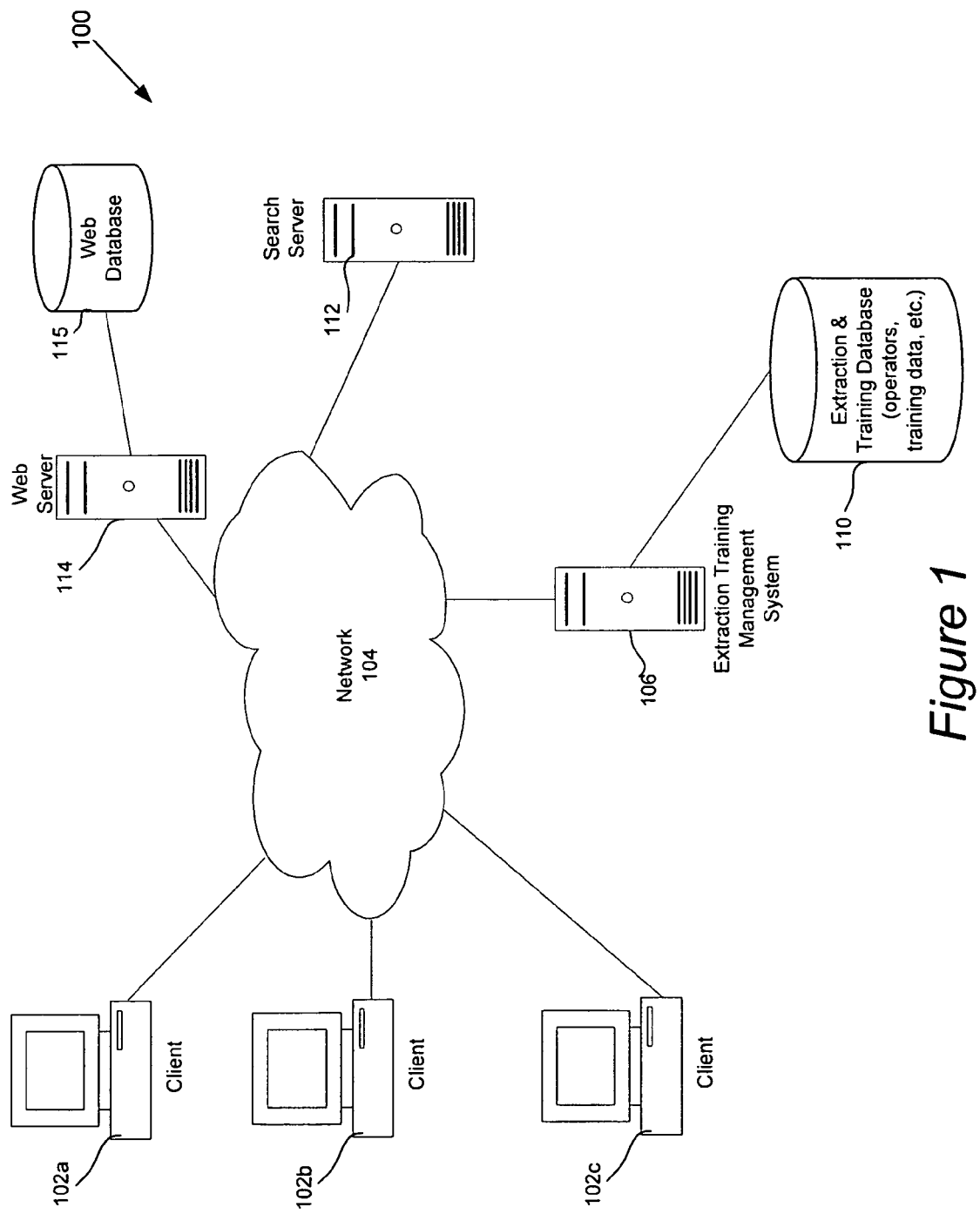
FIG. 1 illustrates an example network segment in which the present invention may be implemented in accordance with one embodiment of the present invention.

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Extensive research has been performed on the detection of entities, such as people, locations, and organizations, as well as the structural relationships between such entities within a document. For purposes of the following description, a document may be any electronic file that includes text, and the terms "web page" and document will be used interchangeably herein. Additionally, any suitable structured or semi-structured entity or structured data may be extracted. Examples of extracted information may include one or more records from a general or relational database, single instances of attribute-values, sequential lists or records of attribute-values, hierarchical (e.g., nested) or non-hierarchical records or lists, etc.

A document may be identified by any suitable identifying information, such as a Uniform Resource Locator (URL) or a file path that identifies a location at which the document can be located. The document may correspond to the web pages of a particular web site, a specific web page on a particular web site, or a particular web snap shot or portion. For instance, a first URL may identify a location of a web page at which a document is located, while a second URL may identify a location of a web site at which the document can be located.

The syntactic format of text representing or identifying people, locations, and organizations is generally well defined. As a result, many existing processes for performing NER to identify the names of these entities yield high rates of precision. However, the syntactic format and structure of other entities such as phone numbers, dates, times, and currencies are not as well-defined. The later type of entities may be referred to as semi-structured named entities.

Semi-structured entities often follow certain syntactic formats according to some conventions. However, the structure of semi-structured entities is typically not well-defined. This makes it very challenging to achieve high detection accuracy for these entities. As a result, regular expressions for detecting these entities are often manually created and hand-tuned. Unfortunately, this manual approach is not scalable if one wants to detect these entities within documents that utilize different formats.

The disclosed embodiments support the location, detection, and/or classification of one or more named entities and their relationships. These named entities may include semi-structured and structured named entities. Moreover, the entities and relationships listed herein are merely examples, and therefore the disclosed embodiments may be applicable to a variety of entities.

Computational processing of documents like web pages to extract structured data, such as entities and relationships, can be very valuable. For example, users can search for a direct answer on top of a structure data repository instead of being given merely pointers to answers. Furthermore, more complicated data mining analysis can be performed, which is often not possible on raw text documents. For example, a variety of popular Internet portals are based on structured information, some or all of which is automatically extracted from other web pages. Examples include ZoomInfo.com (a site hosted by ZoomInfo of Waltham, Mass.), OpenClinical.org (a site maintained at the Advanced Computation Laboratory of the Imperial Cancer Research Fund of Lincoln's Inn Fields, London), and Citeseer.com (a site hosted by College of Information Sciences and Technology, Pennsylvania State University), which deal with professional, medical and bibliographic information, respectively. In another example, it may be useful to a financial services firm to analyze news stories for rumors of corporate takeovers, or to a consumer to determine the price at which an item of interest is being offered for sale on a particular vendor's web page.

In general, embodiments of the present invention provide a training extraction system that integrates training with extraction. In other words, the extraction training system facilitates the inclusion of training within the extraction pipeline. Although certain embodiments are described herein in relation to an extraction training system in relation to textual attribute-values, it should be apparent that an extraction training system may also be provided for other types of attributes, such as links to audiovisual objects (e.g., photographs, music or video clips). It should also be noted that embodiments of the invention are contemplated in which the presentation of the underlying web page is largely unaffected by the overlying training and extraction system. That is, the extracted information may be obtained and used independently of the web page presentation. In alternative embodiments, presentation of the web page, which is being analyzed for information extraction, may be adjusted or altered based on the obtained information.

Prior to describing detailed mechanisms for training a process (herein referred to as "operator") for extracting lists of interest, a computer network architecture will first be briefly described to provide an example context for practicing techniques of the present invention. FIG. 1 illustrates an example network segment 100 in which the present invention may be implemented in accordance with one embodiment of the present invention. As shown, a plurality of clients 102 may access a search application, for example, on search server 112 via network 104 and/or access a web service, for example, on web server 114. Each web server 114 may have access to one or more web database(s) 115 into which web page information is retained.

The network may take any suitable form, such as a wide area network or Internet and/or one or more local area networks (LAN's). The network 104 may include any suitable number and type of devices, e.g., routers and switches, for forwarding search or web object requests from each client to the search or web application, forwarding search or web results back to the requesting clients, or forwarding data between various servers.

Embodiments of the present invention may also be practiced in a wide variety of network environments (represented by network 104) including, for example, TCP/IP-based networks (e.g., Rate Control Protocol or RCP, Transport Control Protocol or TCP, Fast TCP, Stream-based TCP/IP or STCP, eXplicit Control Protocol or XCP, etc.), telecommunications networks, wireless networks, mobile networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The search server 112 may implement a search application. A search application generally allows a user (human or automated entity) to search for web objects (i.e., web documents, videos, images, etc.) that are accessible via network 104 and related to one or more search terms. Embodiments of the present invention may be employed with respect to web pages obtained from web server applications or generated from any search application, such as general search applications that include Yahoo! Search, Google, Altavista, Ask Jeeves, etc., or domain specific search applications that include Yelp (e.g., a product and services search engine), Amazon (e.g., a product search engine), etc. The search applications may be implemented on any number of servers although only a single search server 112 is illustrated for clarity and simplification of the description.

When a search is initiated to a search server 112, such server may then obtain a plurality of web objects that relate to the query input. In a search application, these web objects can be found via any number of servers (e.g., web server 114) and usually enter the search server 112 via a crawling and indexing pipeline possibly performed by a different set of computers (not shown).

Embodiments of the present invention may include an extraction training management system or server 106 for extracting information from web pages and the like. Web pages and the like may also be utilized to train such extraction processes as described further herein. Web pages, web page snap shots, or web page portions may be obtained by any suitable mechanisms, such as the above described search or crawling processes, and such obtained web objects may be retained and utilized herein by the extraction training management system.

The extraction training management system may be implemented within a search server 112 or on a separate server, such as the illustrated extraction training management system 106. In general, the extraction training management system 106 is operable to train an operator for mining a web document for information as described further herein. That is, an operator may be trained and then automatically utilized to extract information in a seamless combination training and extraction process. The extraction training management system 106 may access one or more databases, e.g., extraction & training database 110, for retaining extraction operators, trainer operators, training data or documents, unknown or unclassified documents, etc.

Figure 2:
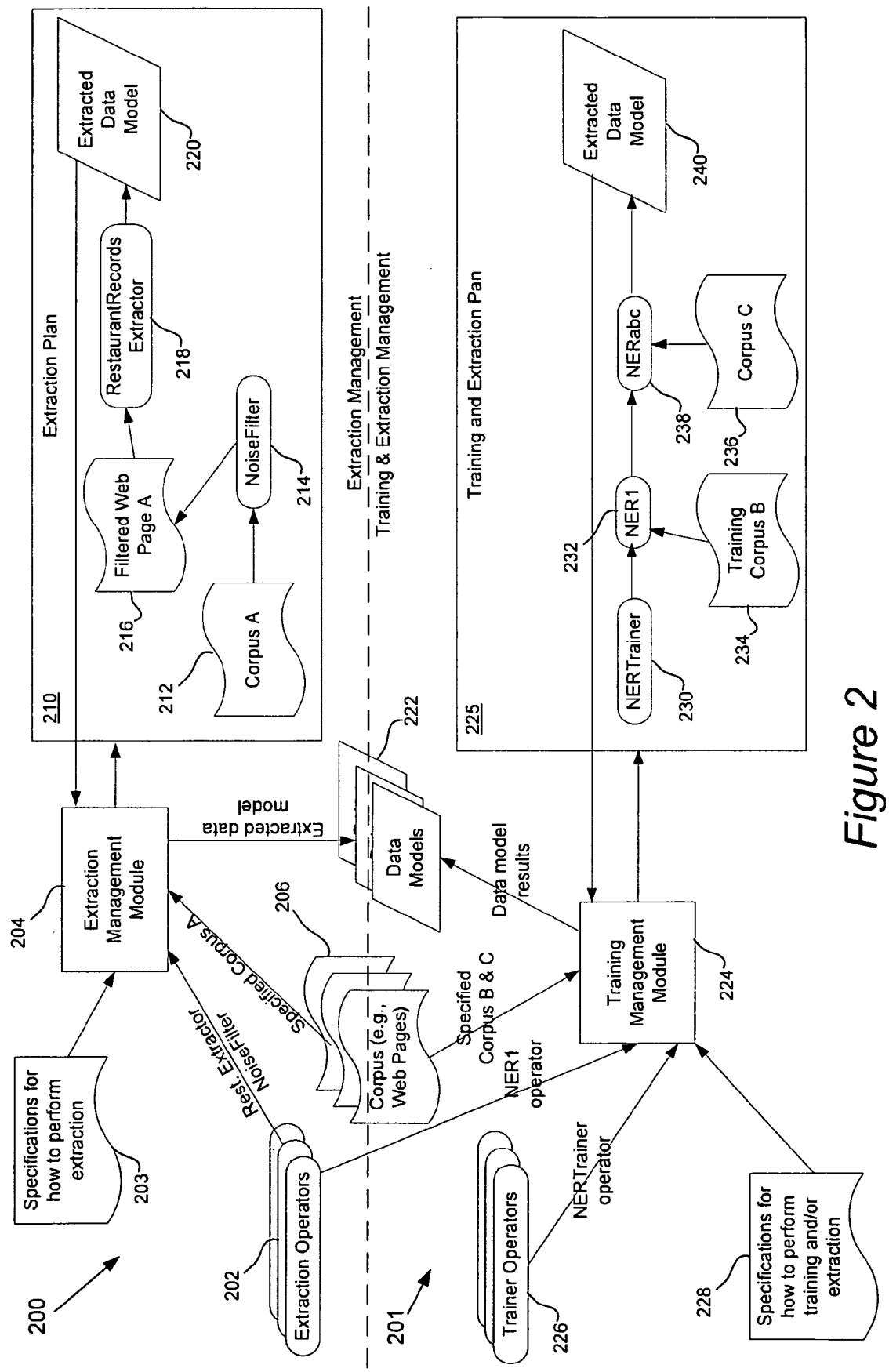
FIG. 2 is a block diagram of an extraction training management system in accordance with a specific embodiment of the present invention.

FIG. 2 is a block diagram of an extraction training management system 200 in accordance with a specific embodiment of the present invention. The system 200 may be conceptually divided into two components: (1) an extraction management component 200 and (2) a training and extraction management component 201. In general, the extraction management component 200 includes a set of extraction operators 202 for extracting information from web pages, and the training and extraction management component 201 includes training operators 226 for training such extraction operators 202.

The extraction operators 202 may each include any suitable process for extracting information from a web page. For instance, the extraction operators may implement domain related processes that are specific to a particular domain (e.g., shopping vs. finance) or general processes that apply to all web pages, regardless of domain. Examples of operators include segmenters for identifying relevant page portions and filtering out noise portions, page classifiers for identifying a page type, domain specific record or name entity extractors (e.g., restaurant records, product records, contact listings, etc.), etc.

In one use of the illustrated system, a user may simply specify an extraction plan via the extraction management module 204 without specifying a training plan. For example, the extraction management module 204 may have access to one or more web pages 206. The specified web pages may be specified and retrieved from any suitable location, such as one or more web server databases 115 or extraction and training databases 110. The extraction management module 204 may also have access to a plurality of extraction operators 202.

When the extraction management module 204 receives user input specifications 203 that specifies how to perform an extraction, the extraction management module 204 may then execute an extraction plan 210 based on the received specifications 203. As illustrated, the extraction plan (as specified by the user specifications 203) entails execution of a specified "NoiseFilter" operator 214 on specified corpus A 212. The output of this NoiseFilter operator 214 is filtered web page A 216, which is then input to a second specified "Restaurant-Records Extractor" operator 218, which operates to extract restaurant records. The extracted restaurant record may take the form of an extracted data model 220, which may represent the extracted entities and relationships between such extracted entities as described further herein. The extracted data model 220 may then be retained by the extraction management module within a data models repository, e.g., data models 222.

The training and extraction management component 201 allows a user to set up a combination training and extraction plan 225 ahead of execution of such combinational plan. As shown in the illustrated example, a training module 224 receives a set of specifications 228 which describe how to perform the training and/or extraction. For example, the specification will identify operators and training data for a particular training and extraction plan. In the illustrated example, the training module 224 also receives (or has access to) specified training corpus B and extraction corpus C, for example, from Corpus 206, specified "NERTrainer" operator from trainer operators 226, and specified trainee "NER1" operator from extraction operators 202. The specifications 228 may also describe how to output the results of the training and extraction.

Based on the specifications, for example, received from a user, the training module then executes the specified training and extraction plan 225. As shown, the specified trainer NERTrainer operator 230 initiates training on specified trainee NER1 operator 232 using training corpus B 234. In general, the trainer operator 230 cause the specified existing trainee operator 232 to be trained, for example, based on new data (e.g., training corpus B). The new "NERabc" operator 238 is the result of training being performed on the trainee NER1 operator 232 by trainer NERTrainer operator 230. This new NERabc operator 238 may then be executed on extraction corpus C 236 so as to extract information from such corpus B. The extraction results may then be retained in any suitable form, such as an extracted data model 240, which may then be retained by training management module 224, for example, in a repository for data models 222.

The training corpus may take any suitable form for use by a training process for training extraction operators. In general the training corpus is associated with identified or classified information of one or more web pages, web page snap shots, or web page portions. For example, training data may provide example attribute-values for particular web page portions. For example, the training data may specify that the "95054" within the web page portion "Sunnyvale, Calif. 95054" is a zip code attribute-value.

Figure 3:
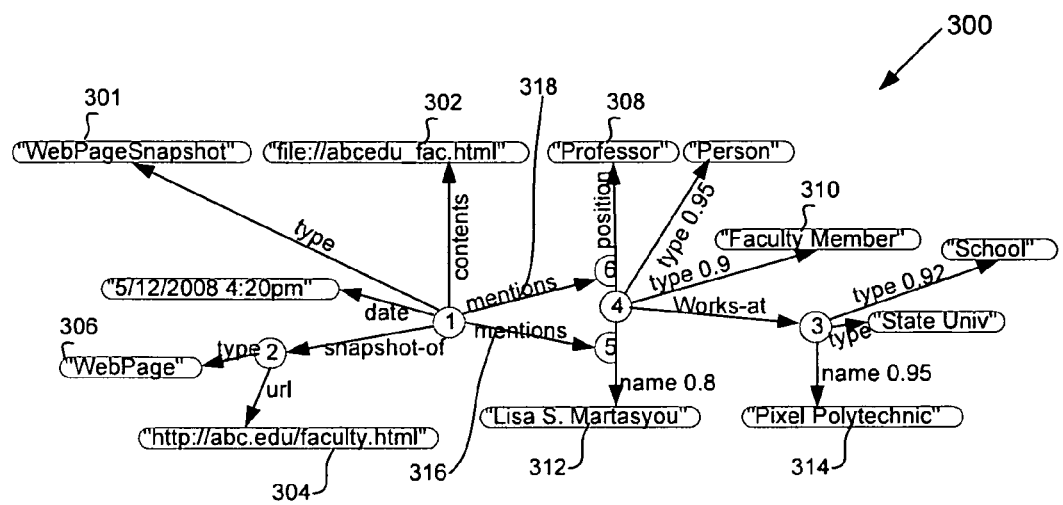
FIG. 3 is a logical representation of an extracted data model in accordance with one example implementation of the present invention.

FIG. 3 is a logical representation of an extracted data model 300 in accordance with one example implementation of the present invention. The extracted data model may include any number and type of entities, as well as representation of relationships between such entities. In general, entities can include specifically labeled parts of the corpus as identified by one or more extraction operators (e.g., semantic or atomic entities), as well as system entities which may represent the web page or web portion of interest. The illustrated example data model 300 represents the extracted entity results that were generated from an operator that extracted information regarding faculty from web pages related to academia. This same data model 300 can also be used by another operator to extract additional information, such as publications, which can then be retained in the data model.

As shown, the illustrated data model 300 includes four major entities 1~4 represented by numbered circles. Entities 1 and 2 are system entities, while entities 3 and 4 are semantic entities. Entity 1 represents a snapshot of a web page (corresponding to entity 1), as indicated by its "type" relationship, which targets the atomic entity "WebPageSnapshot" 301 and as indicated by its "contents" relationship, which targets atomic entity "file://abcedu_fac.html" corresponding to a snapshot URL. Rounded rectangles are used to represent atomic entities.

Entities 3 and 4 represent semantic entities with entity 3 corresponding to a school and entity 4 corresponding to a person. Relationships are represented by arrows, and all relationships can be mapped into entities and be the source or target of other relationships. This concept is illustrated by the person entity 4 having an associated position relationship 6 that corresponds to the atomic value "Professor" 308. Likewise, the person entity 4 also has an associated name relationship 5 that corresponds to the atomic value "Lisa S. Martasyou" 314. In this example, the "mentions" relationship (e.g., 316 and 318), which connect the snapshot entity 1 and the position relationship 6 and name relationship 5, illustrate when a relationship itself is involved in another relationship. In contrast, the school entity 3 is associated with the name atomic value "Pixel Polytechnic" 314 via the relationship "name", which itself is not associated with any other entity or other relationship.

Every relationship may have an associated score although only a few scores are shown. Each score may generally correspond to a confidence value for the particular relationship that was extracted from the source document as described further herein. It is noted that a relationship can be associated with a score, as well as representing a characteristic of an entity. For example, some of the relationship "types" have associated scores, as well as representing a type of object. That is, since a type is associated with an object by some form of classifier, such type can be subject to error, like other attribute values, such as a particular school name value (e.g., Pixel Polytechnic).

In certain embodiments, operators can be declaratively specified. Accordingly, operators can be arranged in any suitable manner that allows users to consistently and easily specify particular operators, as well as information needed for the execution of such particular operators. For example, a language-neutral model of operators is provided as independent executables.

In a specific implementation, extraction operators are modeled at both logical and physical levels. In general, operators correspond to basic units of functionalities (e.g., page classification) and are defined at both a logical and physical level. At the logical level, an operator specifies the information it needs and the information such operator produces. For example, the operator at the logical level specifies the input it consumes and the output it produces, for example, where the input is a collection of retrieval queries and the output is a collection of assertion queries. At the physical level, an operator is further defined by the executables, the associated arguments, the actual input and output files locations, and the necessary environment variables.

Given the separation between the logical and physical levels, specific operator implementations can be easily swapped into and out of the extraction pipeline without affecting the rest of the system, as long as the logical specification is fixed. Consequently, operators written by third parties can be seamlessly leveraged inside the extraction system.

Figure 4:
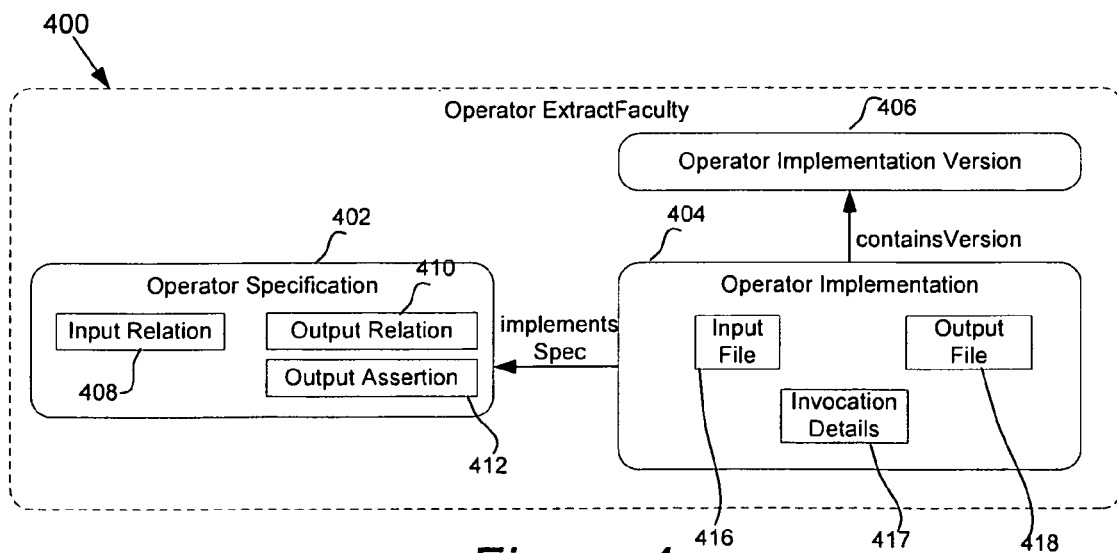
FIG. 4 is a diagrammatic representation of an operator for extracting faculty information in accordance with a specific embodiment of the present invention.

FIG. 4 is a diagrammatic representation of an operator 400 for extracting faculty information in accordance with a specific embodiment of the present invention. The faculty extraction operator 400 may include an operator specification 402, an operator implementation 404, and an operator implementation version 406, which specifies the particular version of the faculty operator as described further herein.

The operator specification 402 generally defines the operator at the logical level. For example the operator specification 402 includes an input relation module 408 for specifying how the operator receives input. In a specific example, the input relation module 408 is a set of retrieval queries. A retrieval query, rq, can be a relatively straightforward language for querying data graphs. More formally, each retrieval query can be a 4-tuple (name, V, ICols, CE), where name is the name of the query, V is the set of entity or score variables, ICols is the set of variables (ICols $\in$ V) whose values are to be retrieved from the data instance, and CE is a constraint expression, which can be recursively defined as CE=c|(CE' and CE")| (CE' or CE")| (not CE'), where c$\in$C and CE' and CE" are themselves constraint expressions. The satisfaction of a constraint expression can follow typical logic rules. For example, a constraint expression (ce1 and ce2) is satisfied if both ce1 and ce2 are satisfied. The answer to the retrieval query is the set of tuples T. Each t$\in$T is a set of value assignments to ICol, and there exists a set of value assignments o to variables (V'=V-ICol) such that CE is satisfied given t and o.

Figure 5:
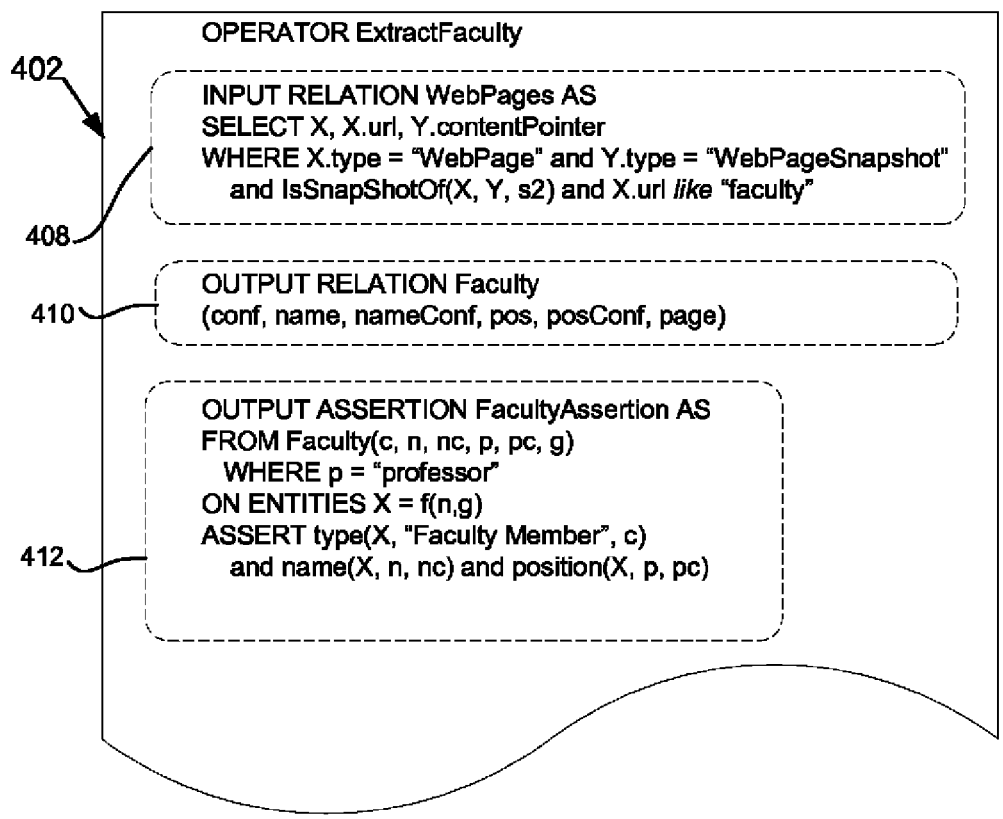
FIG. 5 represents the operator specification of the faculty operator of FIG. 4 in accordance with a specific example of the present invention.

FIG. 5 represents the operator specification 402 of the faculty operator of FIG. 4 in accordance with a specific example of the present invention. In the example of FIG. 5, the input relation module 408 specifies the retrieval query, "WebPages", having a SELECT clause that contains three variables for ICols, and having a WHERE clause that describes the CE. Accordingly, this faculty operator's specification 402 specifies an input in the form of snapshots of web pages with URL's matching the pattern "faculty."

Referring back to FIG. 4, the operator specification 402 may also include output specification in the form of an output relation module 410 and an output assertion module 412, which together specify how to output the results produced by execution of the operator (e.g., how to format and handle the extracted information). One goal of the output specification may be to specify the relationship between an operator's output (and its input) and new data that is to be added to the data model or instance as a set of assertions. Note that "new data" can include new assertions on existing relationships, so it may be that no new entities or attribute values are added.

In one implementation, the output relation module 410 simply describes the schema of a particular output file produced by the operator. In the example of FIG. 5, the operator produces the relation "Faculty" 410, which contains a list of flat tuples for extracted faculty members with attributes corresponding to: overall confidence about the tuple (conf), name of the faculty and confidence about the name (n, nc), position of the faculty and confidence about the position (p, pc), and where the information is extracted from (page).

In this implementation, the output assertions module 412 can describe how to assert the extracted information that was produced by the operator back into the data instance. The output assertions may be defined in a similar way as the retrieval queries, with the addition of assertion constraints, which can be 4-tuples corresponding to new relationships being added to the data instance. In our example of FIG. 5, the assertion query "FacultyAssertion" 412 asserts type, name, and position relationships for each extracted faculty member with a position of "professor".

In one embodiment, the output assertions module 412 may also contain mechanisms for de-duping. In FIG. 5, the variables in the ON ENTITIES clause (e.g., X) of the assertion query 412 guide the creation of new entities, and the optional function following allows "single operator" de-duping. Pages may include many mentions of the same entity (e.g. bibliography pages), and it may be prohibitively expensive to create dozens or hundreds of entities only to subsequently combine them in a de-duping step. In this example, we use "f(n,g)" to indicate that only one new entity X should be created for each unique (name, webpage) pair. A second mechanism may allow "key functions" associated with each type. Unlike relational keys that prevent inserts, these functions can ensure de-duping across extraction events. Mechanisms for entity resolution may also be implemented by an operator.

Figure 6:
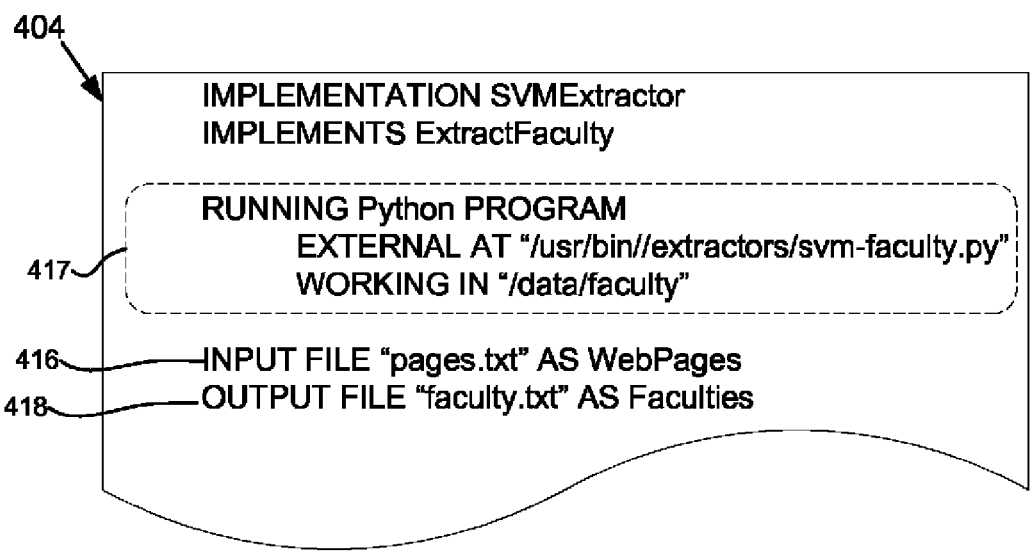
FIG. 6 represents the operator implementation of the faculty operator of FIG. 4 in accordance with a specific example implementation.

Referring back to the operator representation of FIG. 4, the operator implementation component 404 may generally describe the details of how the operator is to be invoked. Thus, the operator implementation 404 may specify an input file 416, an output file 418, and invocation details 417. FIG. 6 represents the operator implementation 404 of the faculty operator 400 of FIG. 4 in accordance with a specific example implementation. As shown, the invocation details 417 specify a python program that is to be executed within the directory "/data/faculty". The input file 416 is specified as "pages.txt" (which corresponds to the input relation WebPages) and the output file 418 is specified as "faculty.txt" (which corresponds to the output relation Faculties).

As mentioned before, the training and extraction system can maintain operators (both specification and implementations) as part of the data instance. As a result, an operator can assert a new operator into the data instance just like it can assert a new regular relationship. This feature allows the modeling of training operators, which can be considered as higher order operators that produce other operators (e.g., a classifier trainer operator can take training data and produce a classifier operator, which can then classify web pages). This training process may simply involve inserting a new operator implementation satisfying an existing operator specification.

Figure 7:
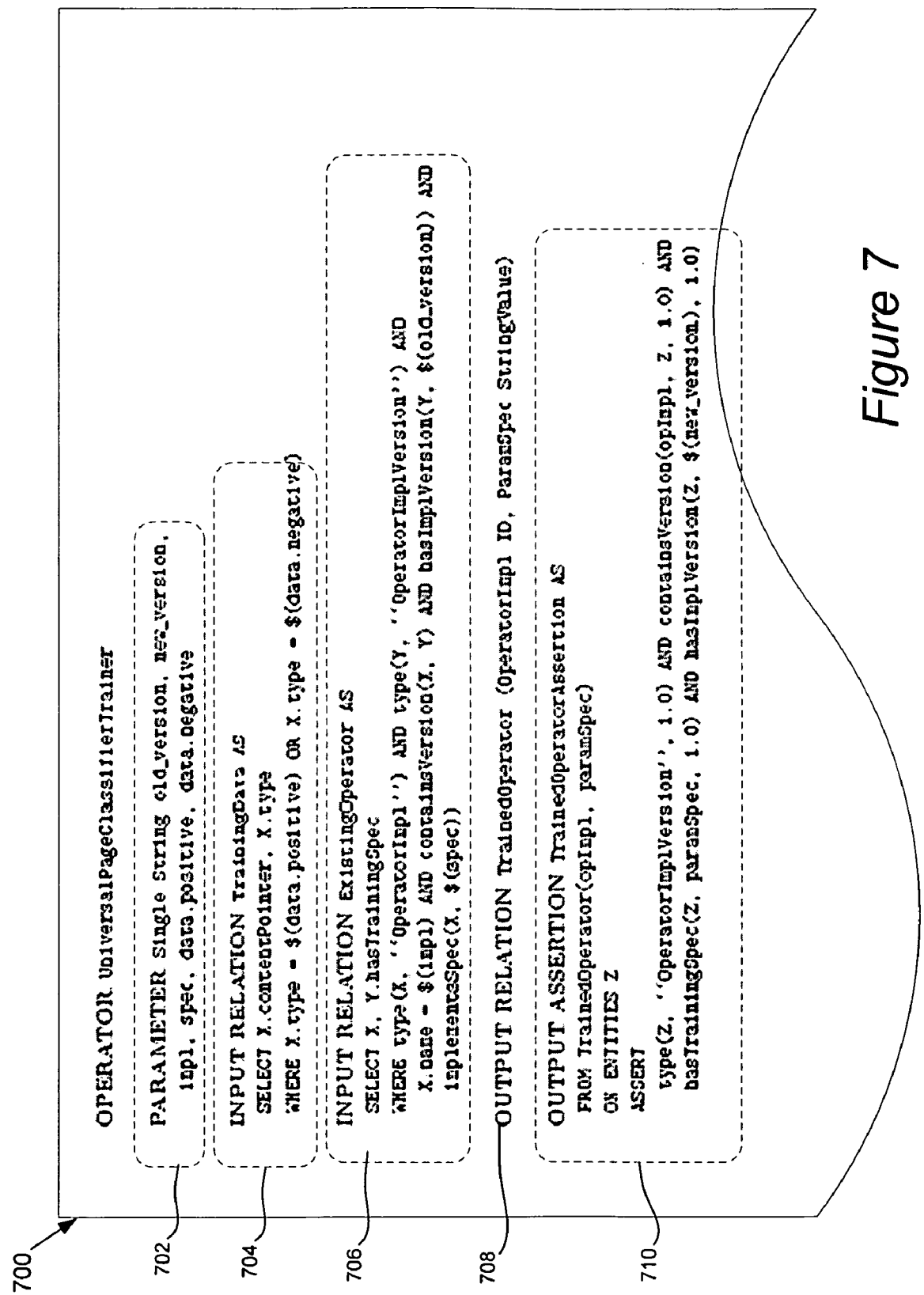
FIG. 7 is a diagrammatic representation of a trainer operator specification for training another operator so as to generate a new trained operator in accordance with one embodiment of the present invention.

FIG. 7 is a diagrammatic representation of a trainer operator specification 700 for training another operator so as to generate a new operator in accordance with one embodiment of the present invention. In this example, the training operator 700 is applicable for all web page classifier operators. The training operator can contain similar components as an extraction operator as described above. As shown, the trainer operator 700 includes one or more configuration parameters 702, an input relation portion 704 that specifies a set of training data, another input relation portion 706 that specifies an existing operator (to be trained), an output relation 708 that specifies the new trained operator, and an output assertion component 710 for adding the newly generated operator and its version number into the data model. A corresponding trainer implementation, similar to the extraction operator implementation described above, would also be provided.

In detail, the configuration parameters 702 allow the trainer operator to be customized independent of the actual trainer operator specification. Example parameters may include classification labels corresponding to positive examples (data.positive) and negative examples (data.negative), existing version number (old_version) and the new trained version number (new_version) of the trainee operator, and operator implementation (impl) and specification (spec) of the trainee operator. The TrainingData input relation 704 specifies the training data to be used for the training process. In this particular example, since page classifiers are being trained, web pages with their contents, as well as their existing classifications are being retrieved as training data. The input relation 706 specifies a trainee operator "ExistingOperator" that is to be retrieved upon which training is to be implemented and from which a new trained operator is to be generated. Output relation 708 specifies a new trained operator "TrainedOperator" that is a modified version of the trainee operator "ExistingOperator" after the trainer operator "UniversalPageClassifierTrainer" is executed on such training operator.

This approach for trainer operator specification can have major advantages. For example, this approach is general so that each trainer specification can work with a large number of different trainer operators that works on the same types of training data (e.g., web pages). One only needs to supply different configuration parameters (which can be provided externally without needing to modify the specification) to switch from one trainer operator (e.g., menu page classifier trainer) to another (e.g., store locator page classifier trainer). This approach can also adapt a specification to a trainer operator that works on different types of training data. For instance, the only change to accomplish such adaptability is to adapt the TrainingData input specification to the desired data type (e.g., switching from web page classifier training to page segment classifier training).

FIGS. 8 through 10 represent example information components of an extraction pipeline that utilize the trainer operator 700 of FIG. 7. Similar to a regular extraction operator, the operator writer specifies the trainee operator (in this example, the MenuPageClassifier) in terms of its operator specification (FIG. 8) and operator implementation (FIG. 9). However, different from the regular operator case, the operator implementation simply serves as the template from which the real operator implementation will be generated. Given the templates, the operator writer can now proceed to write any information extraction plan with the trainer operator being invoked as one of the steps (FIG. 10).

As shown in FIG. 8, the trainee operator specification 800 includes an input relation 802 that specifies all snapshots that are not yet classified (e.g., as either menu or non-menu). In this example, it is assumed that a website classifier has already been executed on a plurality of web pages to classify such web pages as X, Y, and Z types. In the present invention, an extraction and training plan may specify any number of operators be executed with respect to a particular data set, and any number and type of operators executed with respect to such data set (e.g., in a previous plan). The trainee operator specification 800 also includes an output relation 804 and output assertion 806 for specifying the output schema and how to output the results into the data instance, respectively.

As shown in FIG. 9, the trainee operator implementation 900 includes a version portion 902 for specifying the version of the trainee operator. The trainee operator implementation 900 also includes invocation details 904, input file 906, and output file 908 as described herein.

As shown in the plan of FIG. 10, the system will first invoke the training process with respect to the trainee operator MenuPageClassifier, which is specified in the parameter clause 1002. This training process can be customized through the parameter clause 1002. For example, the parameter clause specifies the trainee operator's version and the trained version of the trainee operator, as well as the trainee operator MenuPageClassifier, which is passed onto the trainer operator specification. Other training options are specified by the selection of a specific trainer operator version, which specifies the particular training data set to be used with the specified trainee operator, as described below.

In this example, the plan also contains a trainer specification 1004 for invoking a specific version of the training UniversalpageClassifierTrainer operator with respect to the MenuPageClassifier operator. Such an invocation would generate a new MenuPageClassifier having a new version, e.g., 2.0. The plan 1000 then specifies this new MenuPageClassifier operator 1006 (e.g., version 2.0) to be invoked. The version of this new MenuPageClassifier operator may be automatically generated by the system and associated with the actual classification that results form execution of such MenuPageClassifier operator. It is worth noting here that the training/retraining process can continue without the user modifying the trainer or trainee operators since all the training data and generated models can be maintained by the system.

An alternative approach is to fully model operators by encoding all of their information (e.g., input/output files, environmental variables, etc.) within the data instance. This from-scratch approach, allows an operator to be generated from scratch by creating both the specification and the implementation without the need for a template. However, this alternative approach also means that the actually trainer operator specification will become more complicated since it will have to fully specify the various information. At this stage, it is believed that the template-based approach is more practical, but the from-scratch approach may be considered in the future.

Figure 11:
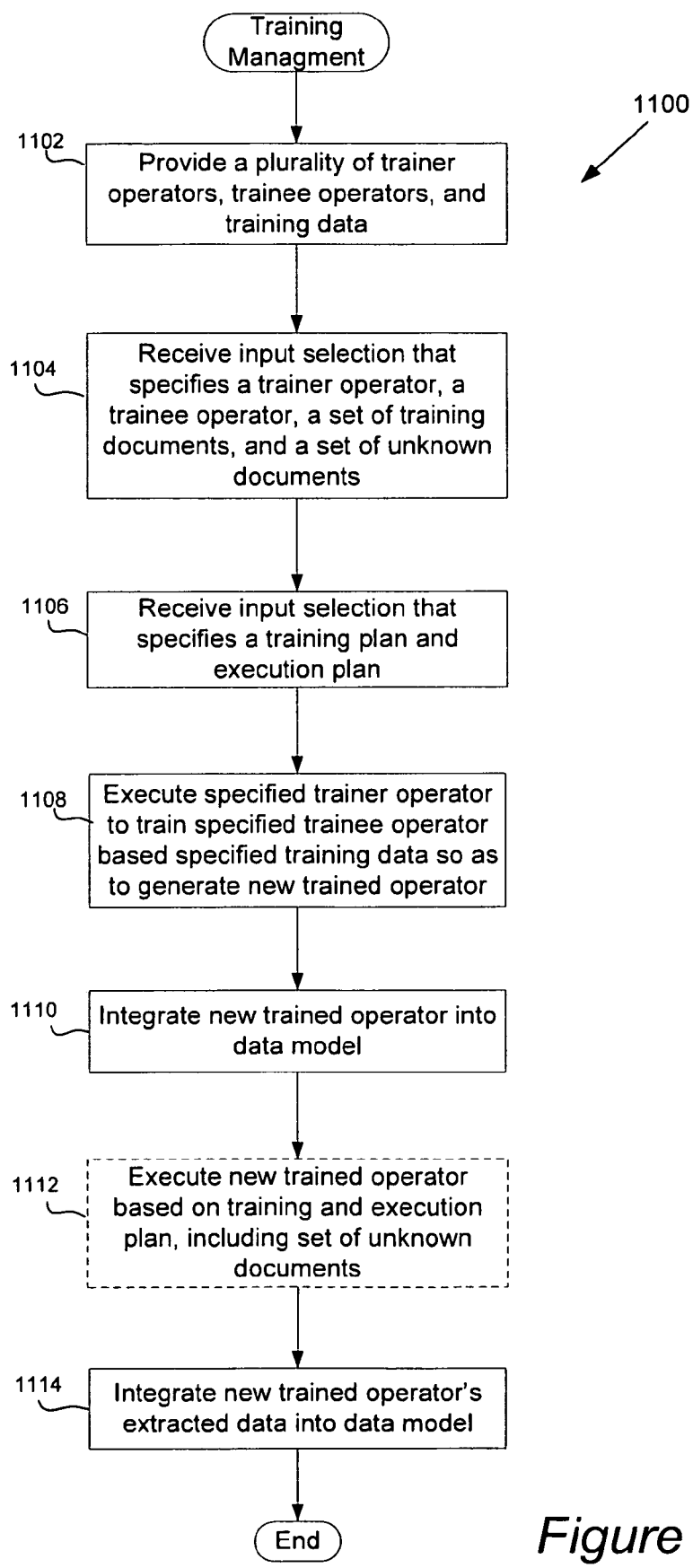
FIG. 11 is a flow chart illustrating a training management process in accordance with a specific implementation of the present invention.

The extraction training system of the present invention may implement any suitable mechanism or processes that allow a user to specify a training and extraction plan. FIG. 11 is a flow chart illustrating a training management process 1100 in accordance with a specific implementation of the present invention. Initially, a plurality of trainer operators, trainee operators, and training data is provided in operation 1102. For example, a plurality of extraction and trainer operators are maintained as described herein. The training data may include any number and type of web pages, web page snapshots, web page or document portions, etc., which have associated information (e.g., extracted information that was previously classified, either manually or automatically).

Input selection that specifies a trainer operator, a trainee operator, a set of training documents, and a set of unknown documents may also be received in operation 1104. Input selection that specifies a training and execution plan may also be received in operation 1106. For example, a user may identify a specific trainer specification and implementation (which is set up to receive specific input training data), a specific trainee operator specification and implementation (which is set up to receive specific input), the version of the output trained operator, and the order of invocation of such specific operators in a training and execution plan as described herein. That is, a training and execution plan (and specified operators) may specify invocation of a trainer operator for initiating training of a trainee operator based on a set of training documents so as to generate a new trained operator that is to then be invoked on a set of unknown documents so as to extract information from such unknown documents.

After receipt of such input (or plan), the specified trainer operator may then be automatically executed to train the specified trainee operator based on the specified training data so as to generate a new trained operator in operation 1108. For example, the trainer may implement its own training processes or implement an external training process with respect to the trainee operator based on the training data.

The new trained operator can then be integrated into the data model in operation 1110. For example, the relationship between the trainee operator, training data, and the new trained operator may be retained. For instance, it may be noted that version 2.0 of the MenuPageClassification operator was generated from version 1.0 of the MenuPageClassification operator and particular training web pages or snapshots. It should be noted that both the trainee and trained operators can be retained for later use, for example, with different data sets or domains.

The new trained operator can then be automatically executed based on the training and execution plan and specified set of unknown documents in operation 1112. That is, the new trained operator is executed on one or more at least partially unclassified documents so as to extract and classify information from such unclassified one or more documents. The new trained operator's extracted data can also be integrated into the data model in operation 1114. For example, the extracted entities, relationships, and atomic values may be associated with the new trained operator. In a specific implementation, particular operator identifiers are associated with extracted entities and/or relationships in the data model. These associations can allow a user to determine which operator generated each piece of extracted and classified information within a data model.

The trainee operator may have been previously trained or never previously trained (e.g., an untrained operator). For example, version 0.0 of the MenuPageClassifier may be trained for the first time on particular type of data, e.g., from a restaurant domain, so as to generate version 1.0 of the MenuPageClassifier. This version 1.0 can also serve as a trainee operator and be trained with respect to a different set of training data, such as from a local businesses domain, so as to generate a new version 2.0 of the MenuPageClassifier. That is, the domain of the training data may vary for training different trainee operator versions.

Each assertion in the data instance can be associated with a score, which can be interpreted as a function of the operator's estimated probability that the target relationship is true given the basis assertions. In case of axiomatic target relationships, there is no uncertainty and the assertion either supports or does not support the relationship. One can interpret the score as a function of probability rather than the probability value itself in order to accommodate a wide variety of execution scenarios that are common in a realistic extraction pipeline. A prime example is one where the operator implicitly assumes extra conditions (e.g., training and test data have identical distributions or restriction to a subset of all possible outcomes) so that the scores do not exactly correspond to conditional probability given the basis assertions.

Another scenario involves operators that output scores that cannot be readily interpreted as conditional probabilities over outcomes, e.g., state vector machine or SVM classifiers and margin-based predictors. Thus, the interpretation of the assertion score could vary depending on the operators as well as the nature of the target relation and the associated tasks (e.g., collection of text artifacts, classification and segmentation of text, record assembly, de-duping, etc.). Assertions by the system (or system reconciler to be exact) can be an important subset of all assertions. In fact, each non-assertion relationship can be the target of at least one system generated assertion. Furthermore, the score of a non-assertion relationship r can be defined as the score of the most recent system assertion associated with r. For this special class of assertions, the scores can be interpreted as the probability that a relationship is true given the schema constraints and various system specific assumptions.

Figure 12:
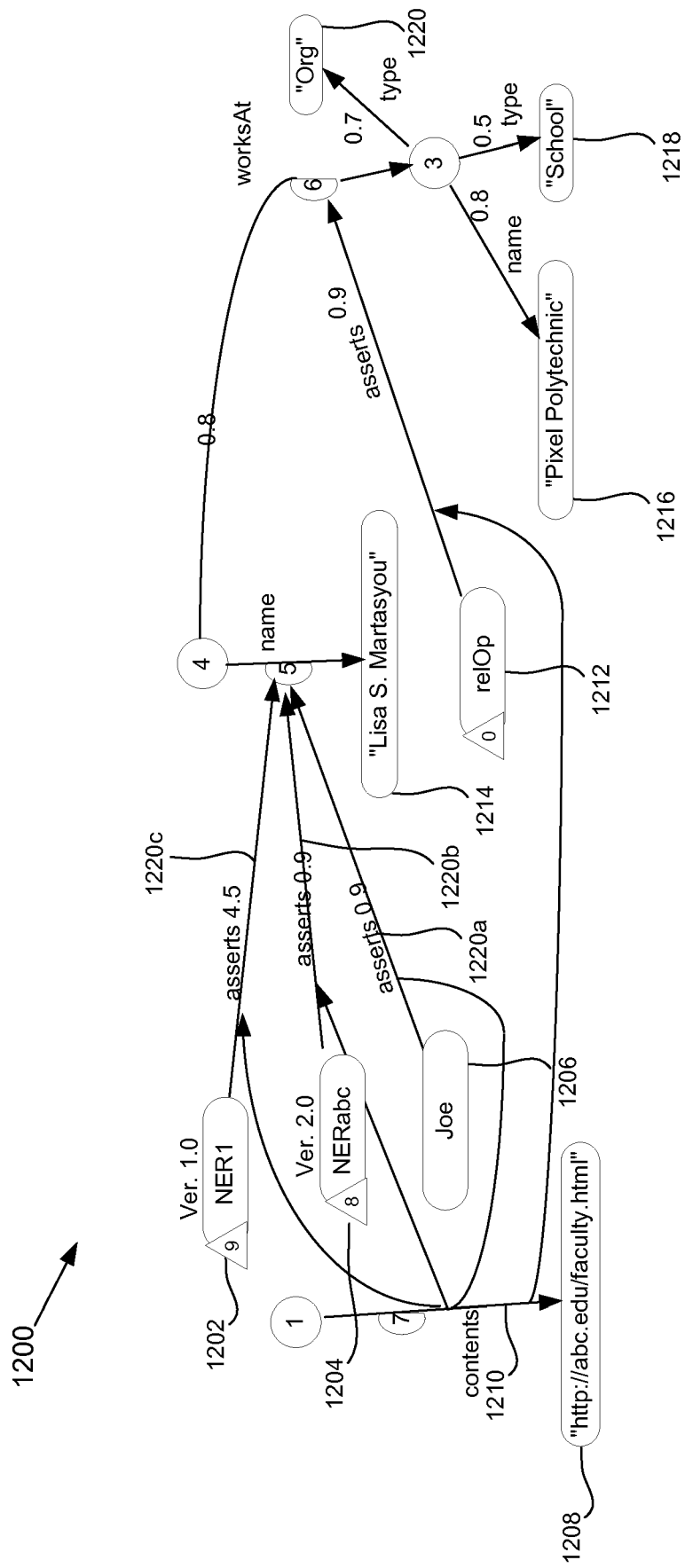
FIG. 12 is a logical representation of an example data model, which is generated and retained by techniques of the present invention.

FIG. 12 is a logical representation of an example data model, which can be generated and retained by techniques of the present invention. In general, the data model may include extracted entities, system entities, associated extracted relationships and their scores as generated by respective extraction operators, as well as identifiers (and versions) for associated operators. As shown, the data model 1200 includes a plurality of operators, along with their versions and asserted output scores, entities (e.g., entities 1, 3 4, 5, 6, and 7) and relationships (e.g., asserts, name, type, worksAt, and contents). The "asserts" relationship indicates that particular operators have asserted output in the form of relationships and entities. For example, the automated operator NER1 (having version 1.0) has asserted (with a 4.5 confidence level) the relationship between entity 4 and its associated name entity and atomic value of "Lisa S. Martasyou" 1214. Likewise, the automated operator relOp 1212 has asserted (with a 0.9 confidence level) the relationship between entity 6 and 4 and the "worksAt" relationship and associated entities (e.g., 3 and 6) and atomic values (e.g., "Pixel Polytechnic" 1216, "school" 1218, and "Org" 1220).

In the real-world, extraction pipelines frequently involve operators with varying bias, scale and confidence levels, and often provide conflicting assertions. For instance, in FIG. 12, the two automated operators 1202 and 1204 (NER1, NERabc) and a user Joe 1206 provide different scores for the same target relationship (names, entity 4, "Lisa S. Martasyou"). Hence, one may adjust for these variations in operator assertion scores by monitoring how these correlate with the "true" probability scores. As shown in FIG. 12, there is a distinction between the three assertion scores on the arrows 1220a~1220c and the relationship (system) assertion score (0.8) corresponding to the relationship (name, entity 4, and "Lisa S. Martasyou"). Operator NER1 might return margins and the assertion score (4.5) cannot be viewed as a probability value, but the system adjusts for these variations to assign a probability of 0.8 to the target relationship.

Incorporating feedback from human users can enable large amounts of training data to be rapidly obtained, as well as naturally scaling up an extraction process across various application domains. For instance, these human users (e.g. Joe 1206 in FIG. 12) can be modeled as operators with fairly general input and output specification based on their data access and editorial privileges. Compared to automated operators, human users can have expertise in a large number of heterogeneous domains (e.g., text classification, segmentation, entity de-duping, etc.). Further, the feedback is often incomplete and corresponds to a biased sample. Anonymity on the Internet also creates additional challenges by allowing malicious behavior and collusion among users.

Since the relationship scores may be conditioned on the specified extraction schema in certain embodiments, mechanisms may be employed to ensure that there are no violations of the schema constraints pertaining to typing, inheritance, relationship cardinality, mutual exclusion, etc. These constraints, in general, can translate to linear equalities and inequalities over the relationship scores that determine a feasible region. For instance, in FIG. 12, the probability of entity 3 being a school is less than that of it being an organization, i.e., Score(type, entity 3, "school")<Score(type, entity 3, "organization") since school is a subtype of organization.

Calibration of operator and human assertion scores may include making certain "oracular" assumptions about how such scores correlate to the "true" probabilities of the relationships. Such assumptions could take the form of knowledge of "true" probabilities on a limited number of relationships or a functional mapping from the assertion scores to the "true" probabilities for a small set of operators.

To address this problem, a Bayesian approach can be adopted. A Bayesian approach can rely on modeling the process of generating the assertion scores as a stochastic transformation of the unknown "true" probabilities of the relationships. In one embodiment, all the available operator assertions, oracular information, and the schema constraints, may be used to estimate the most likely parametric model for the operator (user) behavior. The interpretation of the operator specific parameters can depend heavily on the nature of assertion scores and the allowed class of transformations. For example, in FIG. 12 the parameters could correspond to a linear scaling of the relationship probabilities, for example, (9, 1, 0.9) for the operators NER1, NERabc and Joe, respectively, could result in a final score 0.8 assigned to (names, 4,"Lisa S.") by appropriate adjustment of the assertion scores of these operators, e.g., $0.8=(1/3)\times(4.5/9+0.9/1+0.9/0.9)$. In general, the parameters need not be specific to individual operators, but relate to observed characteristics of the operators, such as a training dataset, and of the target relationships, for example, gender/profession of a person.

Figure 13:
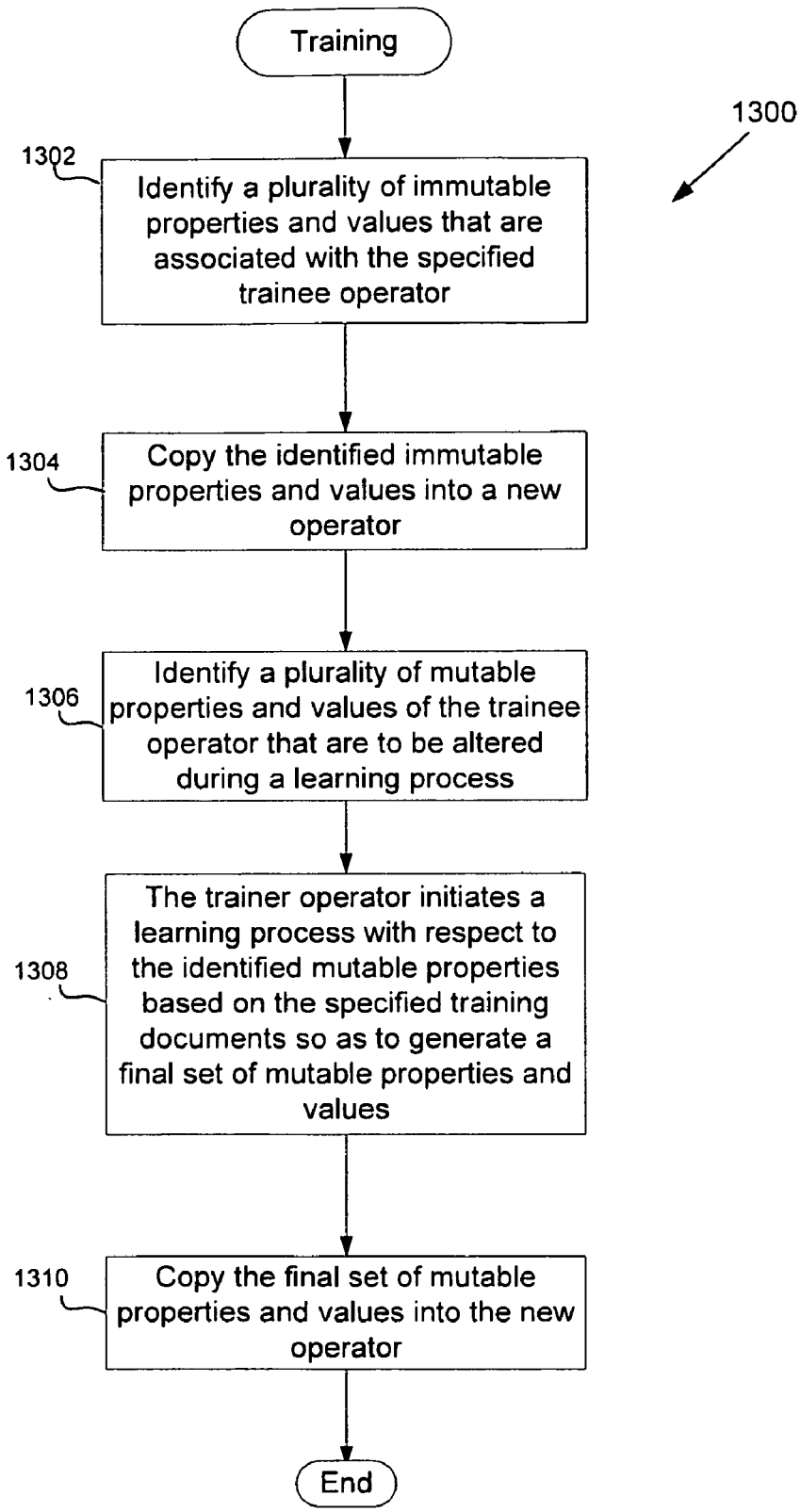
FIG. 13 is a flow chart illustrating a training operation in accordance with a specific implementation of the present invention.

The actual training process as implemented by a trainer operator may be accomplished in any suitable manner. FIG. 13 is a flow chart illustrating a training operation 1300 in accordance with a specific implementation of the present invention. Initially, a plurality of immutable properties and values that are associated with the specified trainee operator can be identified in operation 1302. The identified immutable properties and values may be copied into a new operator in operation 1304.

Immutable properties may include any operator properties which are fixed and do not change during a training process. Examples of immutable properties may include input/output formats, paths to executable files, etc. The immutable properties may be identified in any suitable manner, such as tagging immutable properties of the trainee operator or providing a list of such immutable properties. Thus, the immutable properties of a trainee operator are simply copied into a new trained operator.

A plurality of mutable properties and values of the trainee operator that are to be altered during a learning process are identified in operation 1306. Identification of mutable properties may be accomplished in any suitable manner, for example, as described for immutable properties. Examples of mutable properties may include paths to the current model file, one or more rule sets specifying how to classify information, weights for correlating one or more information features of a document with a particular classification result, one or more models for extracting information from a document, thresholds for the number of features to consider, etc.

The trainer operator initiates a learning process with respect to the identified mutable properties based on the specified training documents so as to generate a final set of mutable properties and values in operation 1308. The final set of mutable properties and values are then copied into the new operator in operation 1310. The final set of mutable properties will likely differ from the trainee operator's associated mutable properties as a result of the training process.

The learning process may take the form of any suitable learning algorithm. Examples of suitable learning techniques include Support Vector Machines (e.g., LIBSVM) and Decision Tree (e.g., TreeNet).

Figure 14:
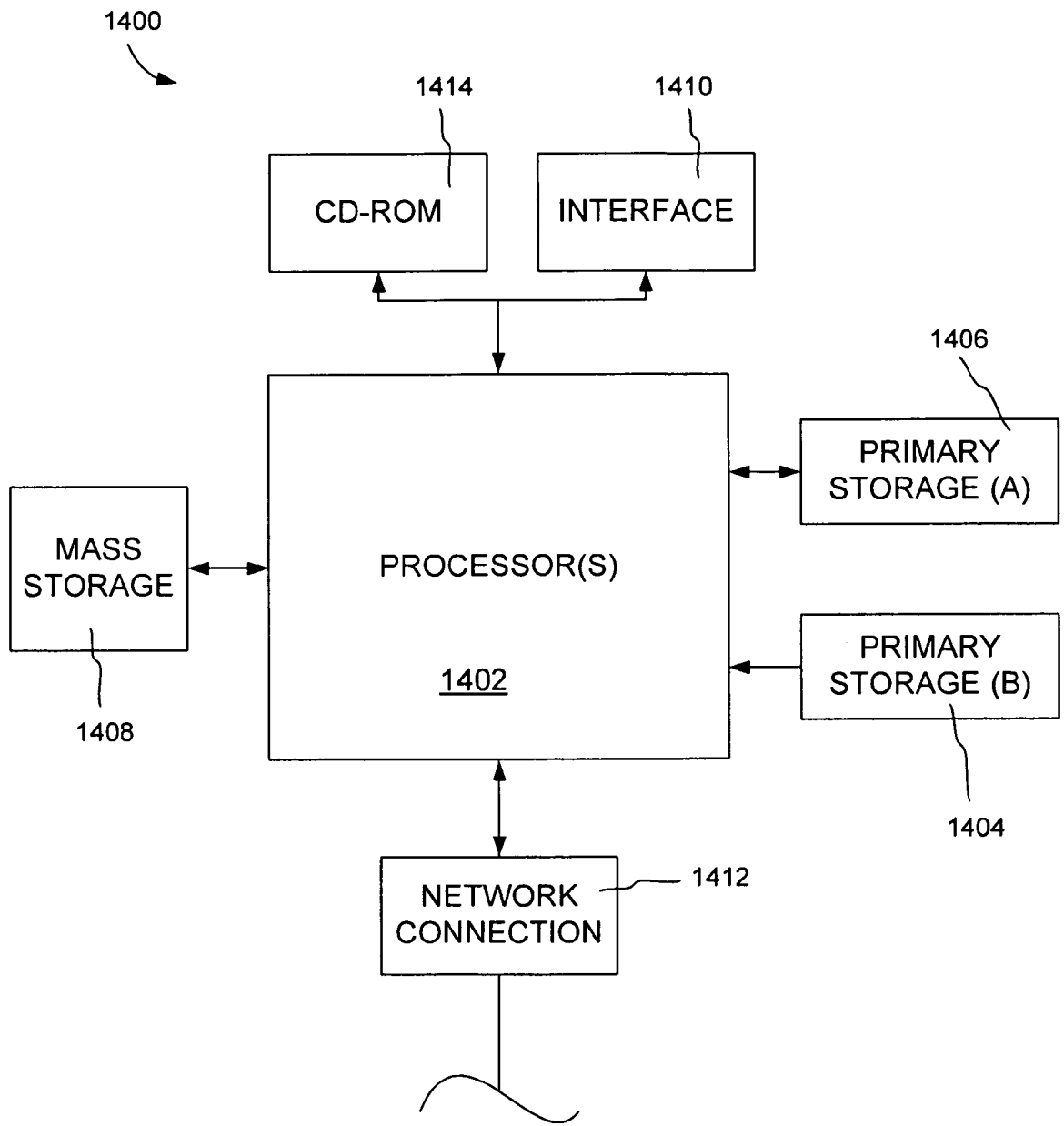
FIG. 14 illustrates an example computer system in which specific embodiments of the present invention may be implemented.

FIG. 14 illustrates a typical computer system that, when appropriately configured or designed, can serve as an extraction and learning system. The computer system 1400 includes any number of processors 1402 (also referred to as central processing units, or CPUs) that are coupled to storage devices including primary storage 1406 (typically a random access memory, or RAM), primary storage 1404 (typically a read only memory, or ROM). CPU 1402 may be of various types including microcontrollers and microprocessors such as programmable devices (e.g., CPLDs and FPGAs) and unprogrammable devices such as gate array ASICs or general-purpose microprocessors. As is well known in the art, primary storage 1404 acts to transfer data and instructions uni-directionally to the CPU and primary storage 1406 is used typically to transfer data and instructions in a bi-directional manner. Both of these primary storage devices may include any suitable computer-readable media such as those described herein. A mass storage device 1408 is also coupled bi-directionally to CPU 1402 and provides additional data storage capacity and may include any of the computer-readable media described herein. Mass storage device 1408 may be used to store programs, data and the like and is typically a secondary storage medium such as a hard disk. It will be appreciated that the information retained within the mass storage device 1408, may, in appropriate cases, be incorporated in standard fashion as part of primary storage 1406 as virtual memory. A specific mass storage device such as a CD-ROM 1414 may also pass data uni-directionally to the CPU.

CPU 1402 is also coupled to an interface 1410 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1402 optionally may be coupled to an external device such as a database or a computer or telecommunications network using an external connection as shown generally at 1412. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store operators, execution plans, input and output files, operator properties, data models, relationship scores, operator versions, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A computer implemented method of extracting information from one or more documents, comprising:

receiving a training and execution plan that specifies invocation of a trainer operator for initiating training of a trainee operator based on a set of training documents so as to generate a trained operator that is to then be invoked so as to extract information from one or more unknown documents, wherein the trainee operator is configured to extract information from one or more unknown documents and each training document is associated with classified information;

after receipt of the training and execution plan, automatically executing the trainer operator to train the trainee operator based on the specified training documents so as to generate a trained operator for extracting information from documents;

after receipt of the training and execution plan, automatically retaining the trained operator for later use in extracting information from one or more unknown documents; and after receipt of the training and execution plan, automatically executing the trained operator on one or more unknown documents so as to extract information from such one or more unknown documents.

2. The method as recited in claim 1, wherein the trainee operator is an untrained operator.

3. The method as recited in claim 1, wherein the trainee operator is a previously trained operator and execution of the trainer operator is accomplished by:

copying a plurality of immutable properties and values from the trainee operator and associating the copied immutable properties and values with the trained operator; and after execution of a learning algorithm results in a set of final mutable properties based on the training data and the trainee operator, associating the final mutable properties with the trained operator, wherein the final mutable properties include one or more of the following: a rule set specifying how to classify information, a plurality of weights for correlating one or more information features of a document with a particular classification result, a model for extracting information from a document, or thresholds for the number of features to consider.

4. The method as recited in claim 1, further comprising associating the trained operator with the extracted information that was generated by such trained operator so that a user can determine that each piece of extracted information was generated by the trained operator.

5. The method as recited in claim 1, wherein the trainee operator is associated with a particular version value, the method further comprising associating the trained operator with a version value that is higher than the particular version value of the trainee operator.

6. The method as recited in claim 1, wherein the trainee operator was generated by executing a learning algorithm on a first set of training documents that includes classified documents from a first domain that differs from a second domain of the specified training documents.

7. The method as recited in claim 3, wherein the values of the final mutable properties differ from a plurality of values of mutable properties as defined by the trainee operator.

8. An apparatus comprising at least a processor and a memory, wherein the processor and/or memory are configured to perform the following operations:

receiving a training and execution plan that specifies invocation of a trainer operator for initiating training of a trainee operator based on a set of training documents so as to generate a trained operator that is to then be invoked so as to extract information from one or more unknown documents, wherein the trainee operator is configured to extract information from one or more unknown documents and each training document is associated with classified information;

after receipt of the training and execution plan, automatically executing the trainer operator to train the trainee operator based on the specified training documents so as to generate a trained operator for extracting information from documents;

after receipt of the training and execution plan, automatically retaining the trained operator for later use in extracting information from one or more unknown documents; and after receipt of the training and execution plan, automatically executing the trained operator on one or more unknown documents so as to extract information from such one or more unknown documents.

9. The apparatus as recited in claim 8, wherein the trainee operator is an untrained operator.

10. The apparatus as recited in claim 8, wherein the trainee operator is a previously trained operator and execution of the trainer operator is accomplished by:

copying a plurality of immutable properties and values from the trainee operator and associating the copied immutable properties and values with the trained operator; and after execution of a learning algorithm results in a set of final mutable properties based on the training data and the trainee operator, associating the final mutable properties with the trained operator, wherein the final mutable properties include one or more of the following: a rule set specifying how to classify information, a plurality of weights for correlating one or more information features of a document with a particular classification result, a model for extracting information from a document, or thresholds for the number of features to consider.

11. The apparatus as recited in claim 8, wherein the processor and/or memory are further configured to associate the trained operator with the extracted information that was generated by such trained operator so that a user can determine that each piece of extracted information was generated by the trained operator.

12. The apparatus as recited in claim 8, wherein the trainee operator is associated with a particular version value, wherein the processor and/or memory are further configured to associate the trained operator with a version value that is higher than the particular version value of the trainee operator.

13. The apparatus as recited in claim 8, wherein the trainee operator was generated by executing a learning algorithm on a first set of training documents that includes classified documents from a first domain that differs from a second domain of the specified training documents.

14. The method as recited in claim 10, wherein the values of the final mutable properties differ from a plurality of values of mutable properties as defined by the trainee operator.

15. At least one non-transitory computer readable storage medium having computer program instructions stored thereon that are arranged to perform the following operations:

receiving a training and execution plan that specifies invocation of a trainer operator for initiating training of a trainee operator based on a set of training documents so as to generate a trained operator that is to then be invoked so as to extract information from one or more unknown documents, wherein the trainee operator is configured to extract information from one or more unknown documents and each training document is associated with classified information;

after receipt of the training and execution plan, automatically executing the trainer operator to train the trainee operator based on the specified training documents so as to generate a trained operator for extracting information from documents;

after receipt of the training and execution plan, automatically retaining the trained operator for later use in extracting information from one or more unknown documents; and after receipt of the training and execution plan, automatically executing the trained operator on one or more unknown documents so as to extract information from such one or more unknown documents.

16. The least one computer readable storage medium as recited in claim 15, wherein the trainee operator is an untrained operator.

17. The least one computer readable storage medium as recited in claim 15, wherein the trainee operator is a previously trained operator and execution of the trainer operator is accomplished by:

copying a plurality of immutable properties and values from the trainee operator and associating the copied immutable properties and values with the trained operator; and after execution of a learning algorithm results in a set of final mutable properties based on the training data and the trainee operator, associating the final mutable properties with the trained operator, wherein the final mutable properties include one or more of the following: a rule set specifying how to classify information, a plurality of weights for correlating one or more information features of a document with a particular classification result, a model for extracting information from a document, or thresholds for the number of features to consider.

18. The least one computer readable storage medium as recited in claim 15, wherein the computer program instructions are further arranged to associate the trained operator with the extracted information that was generated by such trained operator so that a user can determine that each piece of extracted information was generated by the trained operator.

19. The least one computer readable storage medium as recited in claim 15, wherein the trainee operator is associated with a particular version value, wherein the computer program instructions are further arranged to associate the trained operator with a version value that is higher than the particular version value of the trainee operator.

20. The least one computer readable storage medium as recited in claim 15, wherein the trainee operator was generated by executing a learning algorithm on a first set of training documents that includes classified documents from a first domain that differs from a second domain of the specified training documents.

21. The least one computer readable storage medium as recited in claim 17, wherein the values of the final mutable properties differ from a plurality of values of mutable properties as defined by the trainee operator.

22. The computer implemented method as recited in claim 1, wherein the trained operator is a subsequent version of the trainee operator.

23. The computer implemented method as recited in claim 1, wherein automatically retaining the trained operator comprises retaining the trained operator as a subsequent version of the trainee operator.

* * * * *